United States Patent
Pasulka et al.

(10) Patent No.: US 9,960,874 B2
(45) Date of Patent: May 1, 2018

(54) TECHNIQUES FOR MANAGING INTERFERENCE IN A NETWORK ENVIRONMENT

(71) Applicant: Zinwave Limited, Cambridge (GB)

(72) Inventors: Matthew P. Pasulka, Huntsville, AL (US); Andrew Robert Bell, Cambridge (GB)

(73) Assignee: Zinwave, Ltd., Cambridge (GB)

( * ) Notice: Subject to any disclaimer, the term of this patent is extended or adjusted under 35 U.S.C. 154(b) by 0 days. days.

(21) Appl. No.: 15/215,467

(22) Filed: Jul. 20, 2016

(65) Prior Publication Data
US 2018/0026738 A1    Jan. 25, 2018

(51) Int. Cl.
*H04B 1/00*      (2006.01)
*H04J 11/00*     (2006.01)
H04W 84/12      (2009.01)

(52) U.S. Cl.
CPC ......... *H04J 11/0033* (2013.01); *H04W 84/12* (2013.01)

(58) Field of Classification Search
CPC ... H04B 17/345; H04B 7/0452; H04L 1/0631; H04L 1/1867; H04L 2025/03802; H01Q 1/2208; H01Q 1/521
USPC ..................................................... 45/62, 561
See application file for complete search history.

(56) References Cited

U.S. PATENT DOCUMENTS

| | | | | |
|---|---|---|---|---|
| 5,797,084 A | * | 8/1998 | Tsuru | H01Q 1/243 343/751 |
| 6,535,748 B1 | * | 3/2003 | Vuorio | H03D 7/165 455/552.1 |
| 7,486,955 B2 | * | 2/2009 | Fukushima | G06F 1/1616 455/132 |
| 7,881,463 B1 | * | 2/2011 | Sodersjerna | H05K 1/0227 379/413.03 |
| 2005/0047384 A1 | * | 3/2005 | Wax | H04W 72/046 370/338 |
| 2008/0233978 A1 | * | 9/2008 | Batey | H04M 1/05 455/41.2 |
| 2008/0270622 A1 | * | 10/2008 | Gupta | H04L 69/32 709/231 |

(Continued)

*Primary Examiner* — Nguyen Vo
*Assistant Examiner* — Max Mathew
(74) *Attorney, Agent, or Firm* — Maynard, Cooper & Gale, P.C.; Brian Sattizahn

(57) ABSTRACT

Embodiments of the present invention provide techniques for managing interference across multiple transceivers in an access point in a network environment. A wireless networking system can include various access points. These access points may each include multiple transceivers. However, with multiple transceivers in close proximity, signals transmitted by one transceiver may interfere with another transceiver through crosstalk, adjacent channel interference, or other form of interference. Each access point may include an interference manager which can use an interference model to modify a signal transmitted by one transceiver to be used to cancel corresponding interference caused in a second transceiver. Interference can be modeled prior to deployment and/or at deployment using a series of test signals transmitted by one transceiver while the corresponding interference is monitored on a second transceiver. The interference model can be used to transform subsequent signals and used to filter interference from the second transceiver.

15 Claims, 5 Drawing Sheets

(56) References Cited

U.S. PATENT DOCUMENTS

| | | | |
|---|---|---|---|
| 2009/0016263 A1* | 1/2009 | Kishigami | H04B 7/04 370/328 |
| 2009/0111530 A1* | 4/2009 | Nakayama | H04M 1/274516 455/569.2 |
| 2013/0012134 A1* | 1/2013 | Jin | H04B 7/0845 455/62 |
| 2015/0319556 A1* | 11/2015 | Chen | H04W 56/00 455/41.3 |
| 2016/0277791 A1* | 9/2016 | Fu | H04N 21/43637 |
| 2016/0372828 A1* | 12/2016 | Geis | H01Q 3/267 |
| 2017/0094435 A1* | 3/2017 | Lin | H04R 27/00 |
| 2017/0102914 A1* | 4/2017 | Hong | G06F 3/165 |
| 2017/0149856 A1* | 5/2017 | Liu | H04W 4/008 |
| 2017/0180899 A1* | 6/2017 | Proctor, Jr. | H04R 29/007 |

* cited by examiner

TECHNIQUES FOR MANAGING INTERFERENCE IN A NETWORK ENVIRONMENT

BACKGROUND

Wireless networking is an increasingly common feature provided by businesses, residential and commercial spaces, municipalities, and other areas. Wireless networks allocate finite bandwidth to client devices as they connect. For example, wireless local area networks enable many common devices, such as desktop computers, laptop computers, smartphones, digital cameras, tablet computers and digital audio players, to communicate with one another, access network resources, connect to other networks, such as the internet, etc. A wireless network may be deployed using one or more access points arranged in a deployment environment (including indoor and outdoor locations).

These networks typically operate in the ISM (industrial, scientific, and medical) radio bands along with many other devices, such as microwaves, cordless telephones, Bluetooth devices, near field communication devices, etc. As such, these bands are increasingly crowded with devices, and multiple wireless networks, leading to increased interference. Additionally, access points may each include multiple transceivers to, e.g., provide network coverage in different frequency bands, increase range, communication speed, etc. However, with multiple transceivers in close proximity (e.g., within the same access point, or on the same chip), signals transmitted by one transceiver may interfere with another transceiver through crosstalk, adjacent channel interference, or other form of interference.

Embodiments of the present invention provide techniques that address these and other problems in network environments.

SUMMARY

Embodiments of the present invention provide techniques for managing communication with multiple transceivers in an access point in a network environment. A wireless networking system can include various access points. These access points may each include multiple transceivers to e.g., provide network coverage in different frequency bands, increase range, communication speed, etc. However, with multiple transceivers in close proximity (e.g., within the same access point, or on the same chip), signals transmitted by one transceiver may interfere with another transceiver through crosstalk, adjacent channel interference, or other form of interference. Each access point may include an interference manager which can use an interference model to modify a signal transmitted by one transceiver to be used to cancel corresponding interference caused in a second transceiver. Interference can be modeled prior to deployment and/or at deployment using a series of test signals transmitted by one transceiver while the corresponding interference is monitored on a second transceiver. The monitored interference signal can be compared to the transmitted test signal to determine interference characteristics, such as change in amplitude, time delay, phase shift, etc. The interference model can be used to transform subsequent signals transmitted using the transceiver and the transformed signal can then be used to filter interference from the second transceiver.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present invention provide techniques for managing interference across multiple transceivers in an access point in a network environment. A wireless networking system can include various access points. These access points may each include multiple transceivers to e.g., provide network coverage in different frequency bands, increase range, communication speed, etc. However, with multiple transceivers in close proximity (e.g., within the same access point, or on the same chip), signals transmitted by one transceiver may interfere with another transceiver through crosstalk, adjacent channel interference, or other form of interference. Each access point may include an interference manager which can use an interference model to modify a signal transmitted by one transceiver to be used to cancel corresponding interference caused in a second transceiver. Interference can be modeled prior to deployment and/or at deployment using a series of test signals transmitted by one transceiver while the corresponding interference is monitored on a second transceiver. The monitored interference signal can be compared to the transmitted test signal to determine interference characteristics, such as change in amplitude, time delay, phase shift, etc. The interference model can be used to transform subsequent signals transmitted using the transceiver and the transformed signal can then be used to filter interference from the second transceiver.

Figure 1:
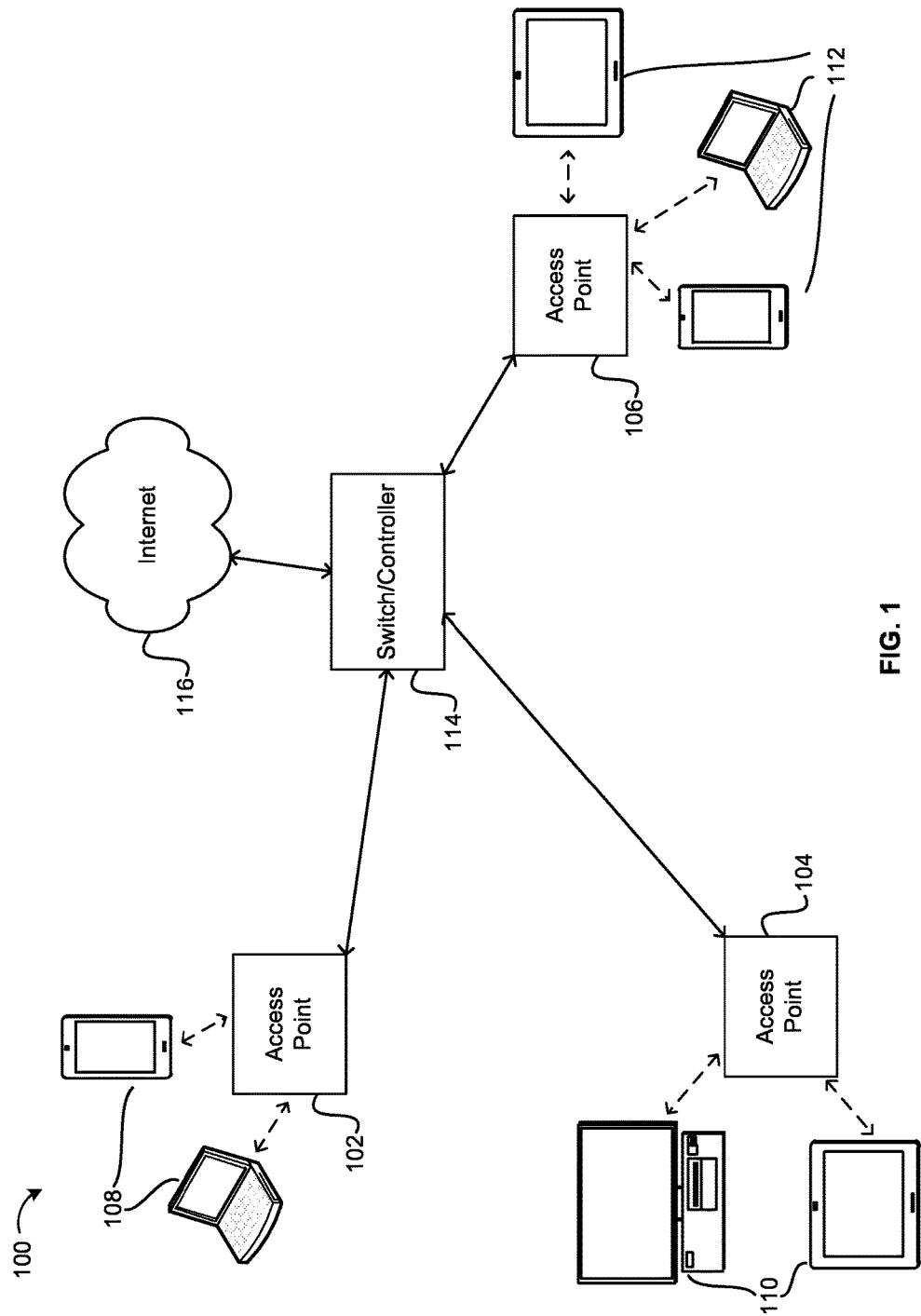
FIG. 1 illustrates an example of a network environment, in accordance with embodiments of the present invention.

FIG. 1 illustrates an example of a network environment 100, in accordance with embodiments of the present invention. As shown in FIG. 1, a wireless networking system can include one or more wireless access points 102, 104, 106 which connect various client devices 108, 110, 112. In various embodiments, client devices may include personal computers, cell phones, handheld messaging devices, laptop computers, set-top boxes, personal data assistants, and any other suitable devices configured to send and receive information over a network. Although embodiments of the present invention are described herein with respect to a wireless local area network (WLAN) implemented using devices that support the IEEE 802.11 family of specifications, the wireless networking system can support any appropriate wireless network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail.

A given access point can communicate with multiple client devices within range of the access point in the deployment environment. The range of any given access point may vary depending on the placement of the access point within the deployment environment (e.g., indoor/outdoor placement, height, local physical obstructions, etc.), antenna type, power output, and local interference (e.g., from other devices operating in the same frequency range).

In the example shown in FIG. 1, switch/controller 114 connects the access points 102, 104, 106 to the internet 116. Switch/controller 114 may connect the access points to various network resources, such as a wired LAN, one or more local or remote servers, data stores, and other resources. In some embodiments, switch/controller 114 can manage more or fewer access points than are shown in FIG. 1. Additionally, multiple switches may be used to connect other access points to a LAN or other network resource. Each access point 102, 104, 106, and/or switch/controller 114, or a combination of devices can perform various management functions. Such management functions can include interference management, power adjustments, device connection management, channel management, and security management (e.g., authentication, authorization, etc.).

For example, switch/controller 114 may provide authentication and authorization services for requests received to access the wireless network. In some embodiments, switch/controller 114 may connect to one or more servers to perform authentication and authorization, which may use information stored in one or more data stores to generate a login page to be displayed on the client device, through which account credentials (e.g., username and password) may be provided. In some embodiments, information may be served to the client devices using HyperText Markup Language ("HTML"), Extensible Markup Language ("XML"), or another appropriate structured language. In various embodiments, data stores may refer to a device or combination of devices configured to store, access, and retrieve data. Such devices may include data servers, databases, data storage devices, data storage media, or any combination thereof. In various embodiments, data stores may be deployed individually, or as a distributed or clustered system.

As discussed further below, as more client devices connect to an access point, the client devices can be assigned to different channels. As more devices connect, devices will share time on the same channel. Devices connected to the same channel each communicate with the access point in turn, with one device transmitting at a given time and other devices deferring communication. Different client devices implementing different versions of the 802.11 specification may connect to the same wireless network. However, as the specification has evolved, the timing parameters have changed. To be backwards compatible, a wireless network implementing an 802.11 standard uses the timing parameters associated with the slowest connected device for a given channel.

Figure 2:
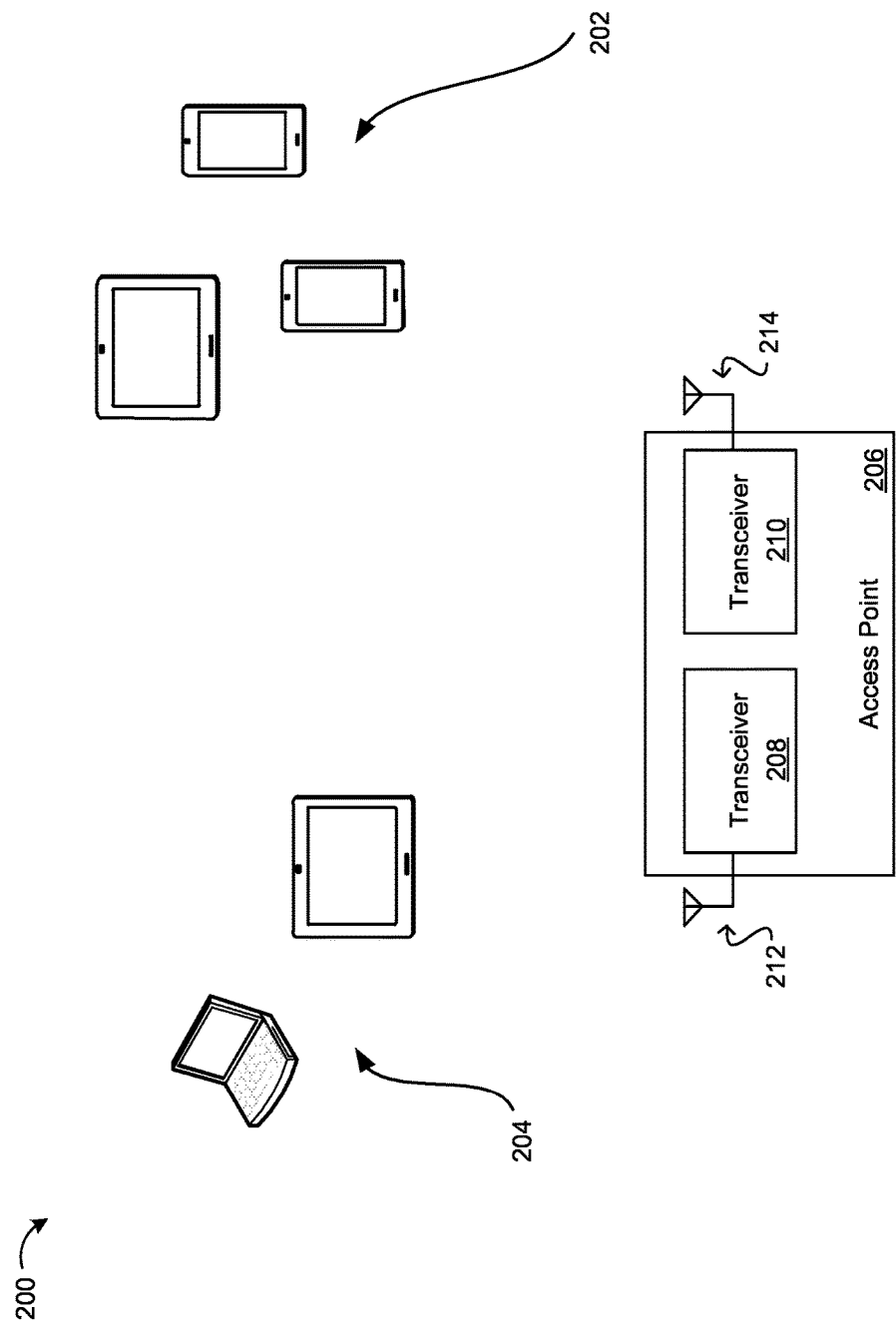
FIG. 2 illustrates an example of managing communication with multiple transceivers in an access point, in accordance with an embodiment of the present invention.

FIG. 2 illustrates an example 200 of communication with multiple transceivers in an access point, in accordance with an embodiment of the present invention. Wireless networking systems, such as that described above with respect to FIG. 1, may include access points deployed at different locations. For example, a wireless networking system that provides a wireless network in outdoor and indoor spaces may include access points that are deployed indoors, to protect the access points from weather conditions that may adversely affect the lifespan and functioning of the access points. Similarly, access points may be deployed to locations where physical access to the access points is limited, to avoid potential damage to the access points. Additionally, the types of access points may vary depending on the type of network being deployed. For example, some access points may include multiple transceivers to provide access to networks in different frequency bands, increase range, communication speed, etc., which may be selected for the wireless networking system depending on the deployment environment, quality of service requirements, or other network requirements.

As shown in FIG. 2, various client devices 202, 204 can connect to a wireless network through access point 206. As discussed above, each access point may service various client devices within the deployment area. As shown in FIG. 2, access point 206 may include multiple transceivers 208, 210 each connected to an associated antenna 212, 214. Each transceiver may be implemented as a separate integrated circuit or module, or multiple transceivers may be implemented in the same module. For example, multiple transceivers may be used to support client devices implementing older and slower communication standards (e.g., 802.11b versus 802.11g, 802.11ac, etc.) which operate in different frequency bands. Additionally, different transceivers may be utilized to transmit on different channels to improve network performance. Slower devices may be connected to one channel through one transceiver and faster devices may be connected to a different channel through a different transceiver, such that the slower devices do not reduce the performance of the faster devices. This use of multiple transceivers can reduce error rates and generally improve network performance and may be used with various connection and channel policies may be used to manage device connections to improve the performance of the wireless network. For example, devices with lower signal strength may be assigned to one channel associated with one transceiver, while devices with higher signal strength may be assigned to a different channel associated with a different transceiver.

As each transceiver 208, 210 transmits and/or receives data, the signals from one transceiver may interfere with the other transceiver. For example, a signal transmitted by transceiver 208 may be received by transceiver 210. Additionally, or alternatively, the transceivers may be located close enough to each other to be electromagnetically coupled, leading to crosstalk between the transceivers and/or connected transmission lines within access point 206. Similar interference may also be caused when signals are received by one transceiver. The potential interference between transceivers in a given access point is in addition to any local interference that may be caused by other nearby devices operating in the same frequency range, physical barriers, and the like. This may reduce the signal to noise ratio (SNR) resulting in reduced range and increased error rates.

In some embodiments, interference between transceivers can be modeled for each pair or other grouping of transceivers. For example, when an access point is deployed, one or more test signals can be used to calibrate the transceivers. The one or more test signals can be transmitted by a first transceiver while one or more of the other transceivers are monitored. The interference signal detected on the monitored transceiver can be analyzed to determine interference signal characteristics. The interference signal characteristics can be compared to the test signal to determine an interference model which represents how signals transmitted by the first transceiver interfere with the other transceivers. In some embodiments, an interference model can be a one-to-one model between a pair of transceivers or can be a one-to-many model for how one transceiver affects each other transceiver in the access point. In some embodiments, an interference power threshold can be used to determine whether to model interference on a given transceiver. For example, if the power level of interference on a monitored transceiver is below a threshold during calibration, the interference may not be modeled for that transceiver. In some embodiments, multiple test signals may be used and the resulting interference from each test signal may be averaged to generate the interference model. Once the interference model has been determined, the interference model can be used to transform signals transmitted by the corresponding transceiver and filter the resulting interference in the other transceivers. For example, the transform may reduce the amplitude and add a time delay or phase shift and then the transformed signal can be used to filter the interference.

Figure 3:
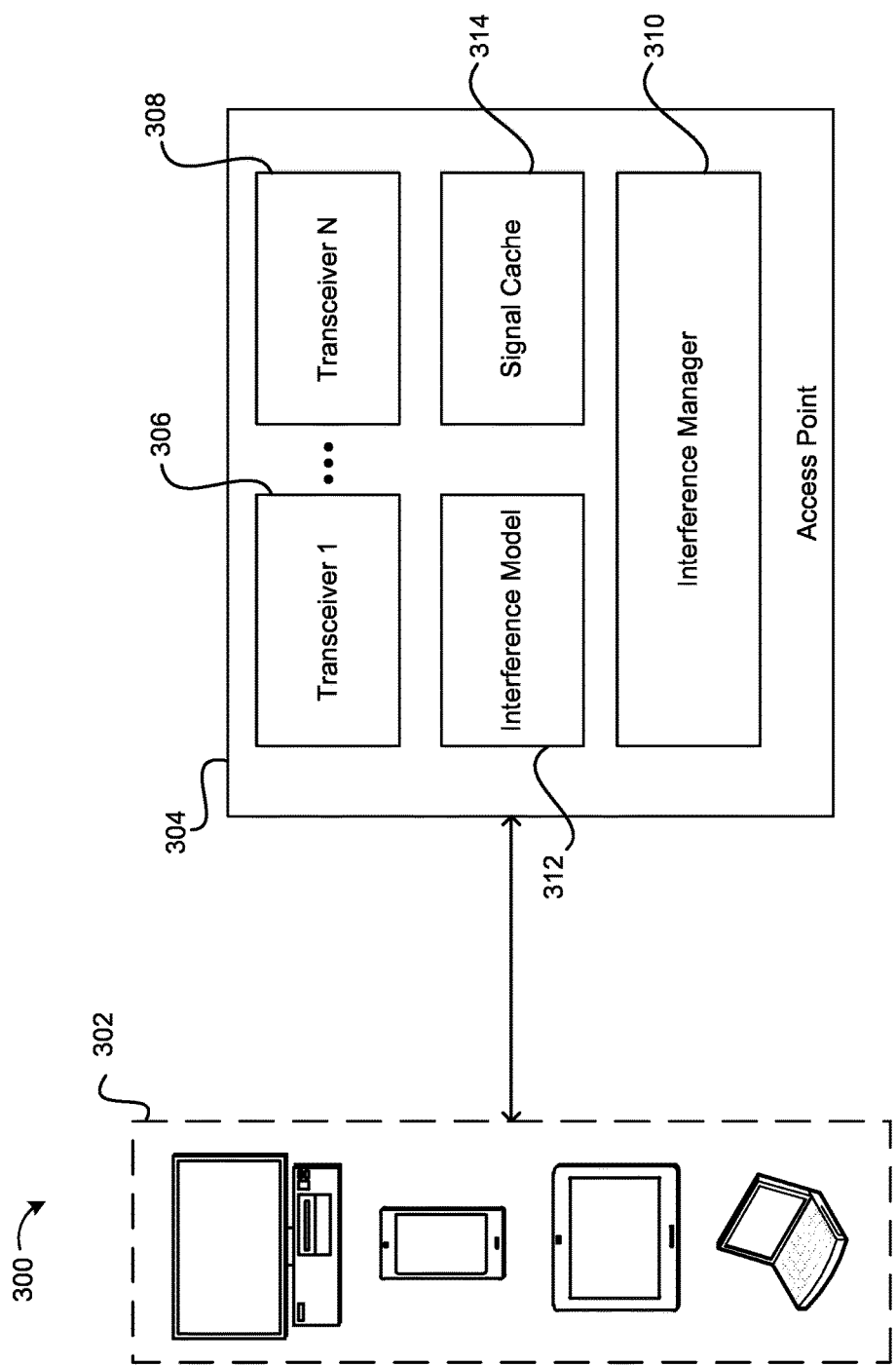
FIG. 3 illustrates a block diagram of an access point in a network environment, in accordance with an embodiment of the present invention.

FIG. 3 illustrates a block diagram of an access point in a network environment 300, in accordance with an embodiment of the present invention. As discussed above, one or more clients 302 can access a wireless network through an access point 304. As shown in FIG. 3, access point 304 can include a plurality of transceivers, including transceiver 1 306 to transceiver N 308. As discussed above, each transceiver may be configured to support different operating bands, channels, or other wireless network features. Access point 304 can also include interference manager 306. When access point 304 is deployed, interference manager 310 can determine an interference model 312 for the access point. For example, interference manager 310 can transmit one or more test signals from signal cache 314 through each transceiver 306, 308 in turn, while monitoring the received interference through the remaining transceivers. As interference may vary from device to device and from deployment environment to deployment environment, such calibration enables the interference for a given deployment to be measured, rather than an average estimate for expected deployments. For example, the electromagnetic shielding between transceivers in a given device may vary, leading to different magnitudes of crosstalk between the transceivers. Similarly, in a deployment environment that causes more energy from one transceiver to be reflected to another transceiver, the measured interference may be greater than expected prior to deployment.

In some embodiments, each test signal may be a reference signal designed to model typical communication over the wireless network being deployed. For example, the signal may be modulated in the same manner as other signals from the wireless network using the same frequency carrier waves. In some embodiments, the test signals used by interference manager 310 may be requested by a connected client device 302. For example, access point 304 may provide wireless network access to client device 302 through one transceiver. Client device 302 may then execute a communication test suite that includes various typical wireless network communications. As the tests are run by client device 302, access point 304 can measure interference at each transceiver, both as data is transmitted and received. This provides interference measurements under live conditions. The tests can then be run for each transceiver in turn to extend the interference model 312 for each component of the access point 304. In some embodiments, such testing can be automated by a switch/controller, such as switch controller 114, or other centralized controller configured to manage multiple access points.

In some embodiments, interference manager 310 can define one or more interference thresholds used during interference modeling. In some embodiments, the thresholds may be dynamically determined based on e.g., ambient noise levels, or other network and/or environmental conditions. In some embodiments, interference manager 310 can determine ambient interference levels using a spectrum analyzer. As discussed above, interference sources may include other access points, cordless phones, microwaves, and other devices operating on the ISM frequency bands shared by the wireless network. The interference thresholds may then be applied from the ambient noise level. For example, if the interference measured at transceiver N 308 is not a threshold number of dB greater than the ambient noise level when a test signal is transmitted using transceiver 1 306, then an interference model may not be determined for transceiver N 308. If, however, the interference measured at transceiver N−1 is greater than the threshold, then the interference model for transceiver N−1 associated with transceiver 1 may be determined. The given a known test signal, having test signal characteristics (e.g., amplitude, frequency, time delay, etc.) and a measured interference signal, having interference signal characteristics, an interference model can be created with transform values for the change in signal characteristics between the test signal characteristics and the interference signal characteristics (e.g., change in amplitude, change in frequency, change in time delay, etc.). In some embodiments, the change in signal characteristics may be averaged across multiple test signals, and transform values corresponding to the average change in signal characteristics may be stored in interference model 312.

In some embodiments, after interference model 312 has been created for the one or more transceivers, the interference model can be used to reduce interference across transceivers. For example, when a signal is transmitted by transceiver 1 306, the signal may be temporarily cached in signal cache 314. Using interference model 312, one or more transformed signals may be generated. For example, the interference model for transceiver 1 306 may include a transform associated with transceiver N 308 and transceiver N−1. Interference model may then be used to create two transformed signals: one corresponding to transceiver N 308, transformed using threshold values based on the measured interference caused between transceiver 1 and transceiver N; and a second corresponding to transceiver N−1, transformed using threshold values based on the measured interference caused between transceiver 1 and transceiver N−1. Each transformed signal can be used to filter the signals that are received through transceiver N and transceiver N−1. For example, the transformed signals can be subtracted from the contemporaneously received signals through the respective transceivers. In some embodiments, such transformation and subtraction can be performed substantially continuously in real-time as data is transmitted through one or more transceivers and interfering with one or more other transceivers.

In some embodiments, transceiver 1 306 and transceiver N 308 may be operating in different frequency bands, such that harmonics of signals transmitted by transceiver 1 are measured as interference on transceiver N. These harmonic interference signals may be measured and modeled as described above where the harmonics interfere in the same frequency range as the main band of the transceiver. Where such interference is measured in predictable frequency ranges outside of the main band, a filter may be applied to that transceiver over the frequency range corresponding to the harmonics.

Figure 4:
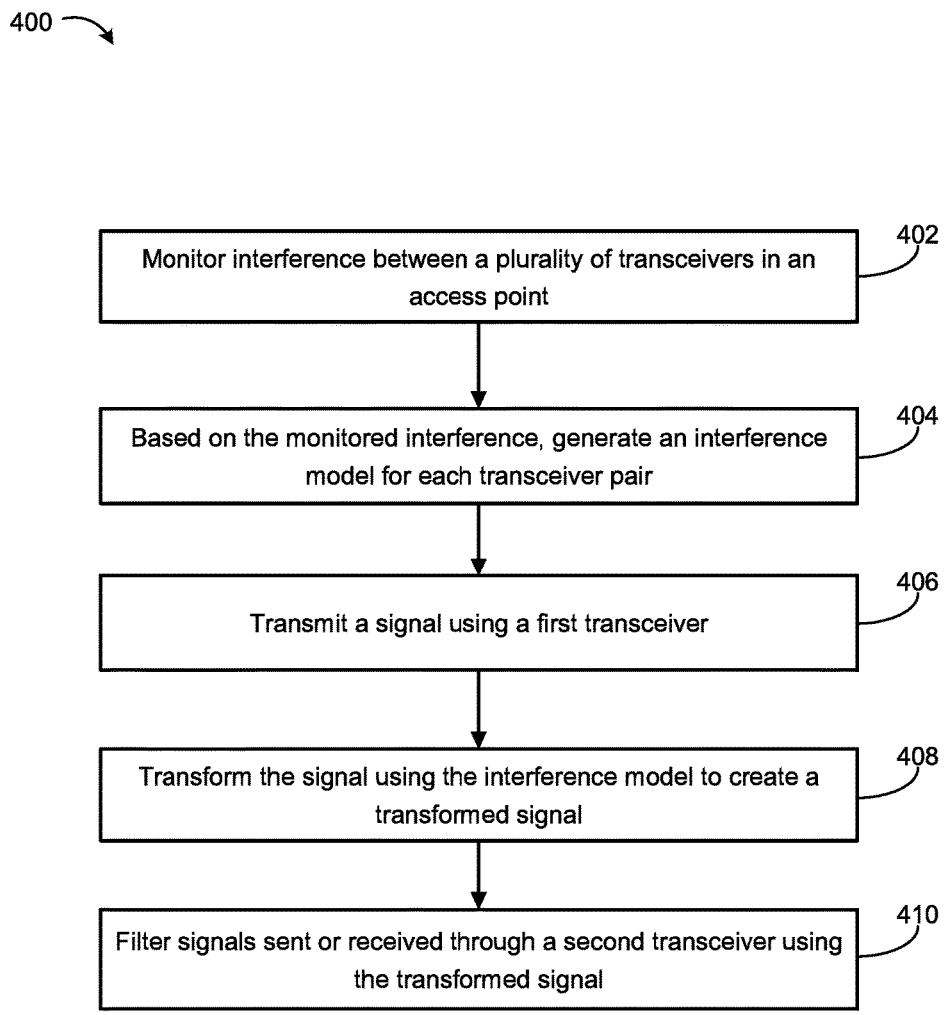
FIG. 4 illustrates a method of managing communication with multiple transceivers in a network environment, in accordance with an embodiment of the present invention.

FIG. 4 illustrates a method 400 of managing communication with multiple transceivers in a network environment, in accordance with an embodiment of the present invention. At 402, interference can be monitored between a plurality of transceivers in an access point. As discussed above, such monitoring can be performed when the access point is deployed, enabling the interference of one transceiver to another in the deployment environment to be monitored. In some embodiments, such monitoring can include transmitting a test signal using the first transceiver and receiving an interference signal using the second transceiver. In some embodiments, a test client can be used to send and receive test signals with the access point, enabling the access point to be tested under conditions similar to the live deployment prior to the live deployment of the wireless network. In some embodiments, the monitored interference may be compared to an interference threshold. The interference threshold may be applied relative to an ambient noise level (e.g., caused by other devices within the ISM band, other access points, etc.). If the monitored interference between two or more transceivers is greater than a threshold (e.g., a threshold dB over the ambient noise level), then the interference between those transceivers can be modeled. If it is lower than the threshold, that combination of transceivers may be ignored, or a flag or other data indicating that no transformation should be performed can be stored.

At 404, based on the monitored interference, an interference model can be generated for at least one pair of transceivers from the plurality of transceivers. As discussed above, generating the interference model can include analyzing the test signal to determine one or more test signal characteristics and analyzing the interference signal to determine one or more interference signal characteristics. As discussed above, the test signal characteristics and the interference signal characteristics include corresponding values of one or more of amplitude, frequency, or time delay. The one or more test signal characteristics can be compared to the one or more interference signal characteristics to determine the interference model. For example, the interference model can include values that indicate a change in amplitude, a change in frequency, or a change in time delay between the test signal and the interference signal. The interference model can include a plurality of transforms associated with a given transceiver, where each of the plurality of transforms are associated with the interference caused by that receiver in a different transceiver from the plurality of transceivers in the access point.

With the model created, the access point can be deployed and the wireless network can receive live traffic data from connected devices. At 406, a signal can be transmitted using a first transceiver. An interference manager can monitor the signal that is transmitted and identify one or more transforms in the interference model associated with the first transceiver (e.g., corresponding to interference caused by the first transceiver in other transceivers in the access point).

At 408, the signal can be transformed using the interference model for the at least one pair of transceivers, the at least one pair of transceivers including the first transceiver. In some embodiments, multiple transformed signals can be generated, each corresponding to a different transceiver that receives interference from the first transceiver. The transforms may change the amplitude, frequency, time delay, or other signal characteristics based on the observed changes to the test signals used to generate the interference model.

At 410, signals received through a second transceiver can be filtered using the transformed signal. For example, the transformed signal can be subtracted from the signals received through the second transceiver. In some embodiments, the transformed signal can be shifted 180 degrees out of phase and combined with the signals received through the second transceiver to nullify the interference signal. As discussed above, multiple transformed signals can be used to filter the signals received through multiple transceivers, based on the interference model.

Figure 5:
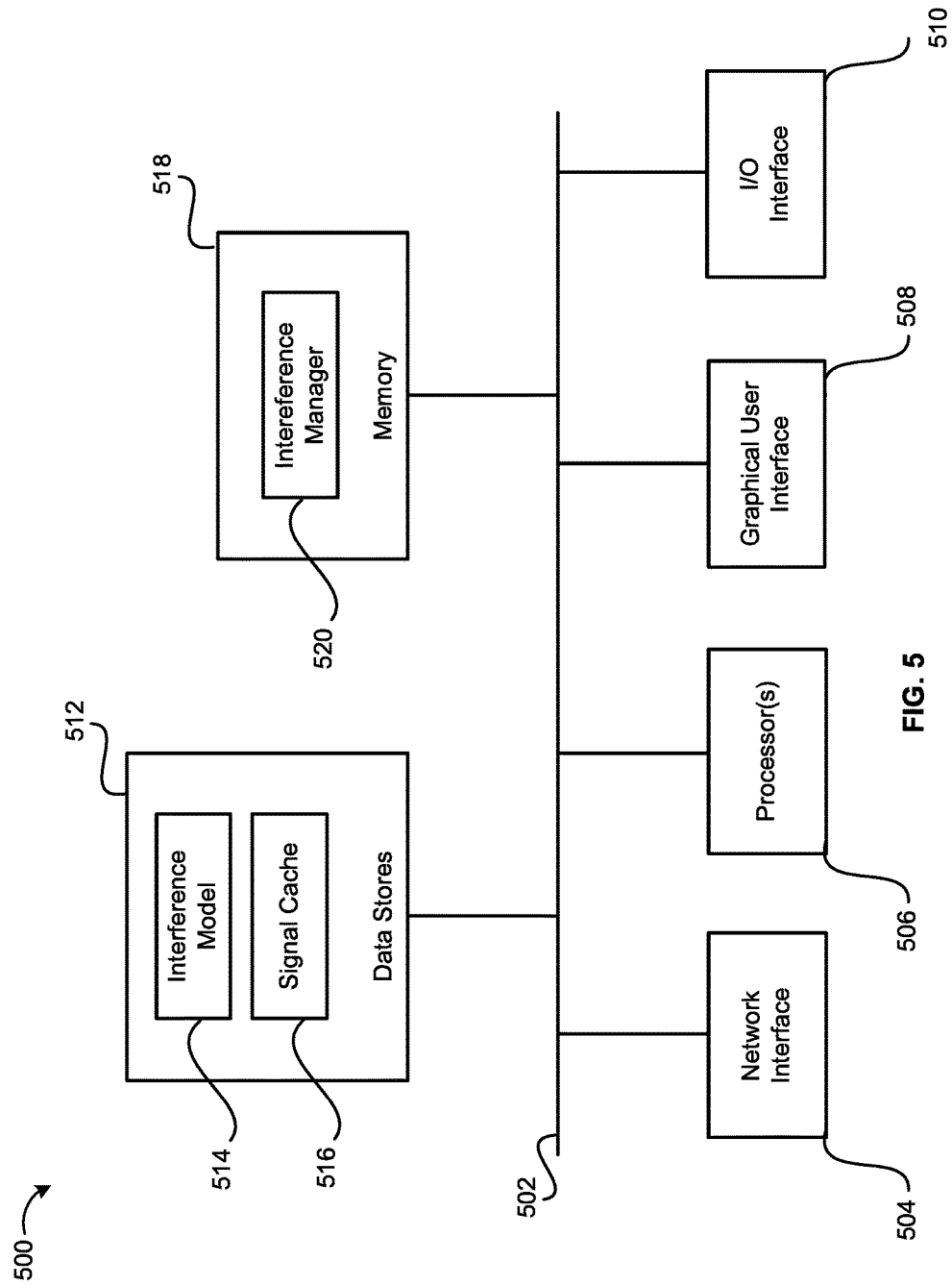
FIG. 5 illustrates a high level block diagram of a computer system, in accordance with an embodiment of the present invention.

FIG. 5 illustrates a high level block diagram of a computer system 500, in accordance with an embodiment of the present invention. As shown in FIG. 5, a computer system can include hardware elements connected via a bus 502, including a network interface 504, that enables the computer system to connect to other computer systems over a wireless local area network (WLAN), wide area network (WAN), mobile network (e.g., EDGE, 3G, 4G, or other mobile network), or other network. Network interface 504 can further include a wired or wireless interface for connecting to infrared, Bluetooth, or other wireless devices, such as other client devices, network resources, or other wireless capable devices. The computer system can further include one or more processors 506, such as a central processing unit (CPU), field programmable gate array (FPGA), application-specific integrated circuit (ASIC), network processor, or other processor. Processors may include single or multi-core processors.

In some embodiments, the computer system can include a graphical user interface (GUI) 508. GUI 508 can connect to a display (LED, LCD, tablet, touch screen, or other display) to output user viewable data. In some embodiments, GUI 508 can be configured to receive instructions (e.g., through a touch screen or other interactive interface). In some embodiments, I/O interface 510 can include various interfaces for user input devices including keyboards, mice, or other user input devices.

In some embodiments, the computer system may include local or remote data stores 512. Data stores 512 can include various computer readable storage media, storage systems, and storage services, as are known in the art (e.g., disk drives, CD-ROM, digital versatile disk (DVD) or other optical storage, magnetic cassettes, magnetic tape, magnetic disk storage or other magnetic storage devices, relational databases, object storage systems, local or cloud-based storage services, or any other storage medium, system, or service). Data stores 510 can include data generated, stored, or otherwise utilized as described herein. For example, data stores 512 can include all or portions of interference model 514 as well as interference thresholds and other data. Data stores 512 may also include signal cache 516 and other client device data, generated and stored as described above. Memory 518 can include various memory technologies, including RAM, ROM, EEPROM, flash memory or other memory technology. Memory 518 can include executable code to implement methods as described herein, such as interference manager 520.

A computing device typically will include an operating system that provides executable program instructions for the general administration and operation of that computing device and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 5. Thus, the depiction of the system 500 in FIG. 5 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    monitoring interference between a plurality of transceivers in an access point, comprising:
        transmitting a test signal using a first transceiver; and
        receiving an interference signal using a second transceiver;
    based on the monitored interference, generating an interference model for at least one pair of transceivers from the plurality of transceivers, comprising:
        analyzing the test signal to determine one or more test signal characteristics;
        analyzing the interference signal to determine one or more interference signal characteristics; and
        comparing the one or more test signal characteristics to the one or more interference signal characteristics to determine the interference model;
    transmitting a signal using the first transceiver;
    transforming the signal using the interference model for the at least one pair of transceivers, the at least one pair of transceivers including the first transceiver; and
    filtering signals received through the second transceiver using the transformed signal.

2. The method of claim 1, wherein the test signal characteristics and the interference signal characteristics include corresponding values of one or more of amplitude, frequency, or time delay.

3. The method of claim 2, wherein the interference model includes a transform associated with the at least one pair of transceivers, the transform including values corresponding to one or more of a change in amplitude, a change in frequency, or a change in time delay.

4. The method of claim 1, wherein the interference model includes a plurality of transforms associated with the first transceiver, each of the plurality of transforms associated with interference caused by the first transceiver in a different transceiver from a plurality of transceivers in the access point.

5. The method of claim 1, wherein monitoring interference between a plurality of transceivers in an access point, further comprises:
    determining the interference between the plurality of transceivers is greater than a threshold, the threshold determined relative to ambient noise levels.

6. A wireless networking system comprising:
    at least one access point, include a computer readable medium and processor, the at least one access point configured to:
    monitor interference between a plurality of transceivers in an access point, comprising:
        transmit a test signal using a first transceiver; and
        receive an interference signal using a second transceiver;
    based on the monitored interference, generate an interference model for at least one pair of transceivers from the plurality of transceivers, comprising:
        analyze the test signal to determine one or more test signal characteristics;
        analyze the interference signal to determine one or more interference signal characteristics; and
        compare the one or more test signal characteristics to the one or more interference signal characteristics to determine the interference model;
    transmit a signal using the first transceiver;
    transform the signal using the interference model for the at least one pair of transceivers, the at least one pair of transceivers including the first transceiver; and
    filter signals received through the second transceiver using the transformed signal.

7. The wireless networking system of claim 6, wherein the test signal characteristics and the interference signal characteristics include corresponding values of one or more of amplitude, frequency, or time delay.

8. The wireless networking system of claim 7, wherein the interference model includes a transform associated with the at least one pair of transceivers, the transform including values corresponding to one or more of a change in amplitude, a change in frequency, or a change in time delay.

9. The wireless networking system of claim 6, wherein the interference model includes a plurality of transforms associated with the first transceiver, each of the plurality of transforms associated with interference caused by the first transceiver in a different transceiver from a plurality of transceivers in the access point.

10. The wireless networking system of claim 6, wherein the at least one access point, configured to monitor interference between a plurality of transceivers in an access point, is further configured to:

determine the interference between the plurality of transceivers is greater than a threshold, the threshold determined relative to ambient noise levels.

11. A non-transitory computer readable storage medium including instructions stored thereon which, when executed by a processor, cause the processor to:
monitor interference between a plurality of transceivers in an access point, comprising:
transmit a test signal using a first transceiver; and
receive an interference signal using a second transceiver;
based on the monitored interference, generate an interference model for at least one pair of transceivers from the plurality of transceivers, comprising:
analyze the test signal to determine one or more test signal characteristics;
analyze the interference signal to determine one or more interference signal characteristics; and
compare the one or more test signal characteristics to the one or more interference signal characteristics to determine the interference model;
transmit a signal using the first transceiver;
transform the signal using the interference model for the at least one pair of transceivers, the at least one pair of transceivers including the first transceiver; and
filter signals received through the second transceiver using the transformed signal.

12. The non-transitory computer readable storage medium of claim 11, wherein the test signal characteristics and the interference signal characteristics include corresponding values of one or more of amplitude, frequency, or time delay.

13. The non-transitory computer readable storage medium of claim 12, wherein the interference model includes a transform associated with the at least one pair of transceivers, the transform including values corresponding to one or more of a change in amplitude, a change in frequency, or a change in time delay.

14. The non-transitory computer readable storage medium of claim 11, wherein the interference model includes a plurality of transforms associated with the first transceiver, each of the plurality of transforms associated with interference caused by the first transceiver in a different transceiver from a plurality of transceivers in the access point.

15. The non-transitory computer readable storage medium of claim 11, wherein the instructions to monitor interference between a plurality of transceivers in an access point, further cause the processor to:
determine the interference between the plurality of transceivers is greater than a threshold, the threshold determined relative to ambient noise levels.

* * * * *